US011314999B2

(12) United States Patent
Pohjola

(10) Patent No.: US 11,314,999 B2
(45) Date of Patent: Apr. 26, 2022

(54) DATA CARRIER AND A METHOD FOR PRODUCING SUCH DATA CARRIER

(71) Applicant: THALES DIS FRANCE SA, Meudon (FR)

(72) Inventor: Teemu Pohjola, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 16/648,203

(22) PCT Filed: Sep. 18, 2018

(86) PCT No.: PCT/EP2018/075160
§ 371 (c)(1),
(2) Date: Mar. 17, 2020

(87) PCT Pub. No.: WO2019/053281
PCT Pub. Date: Mar. 21, 2019

(65) Prior Publication Data
US 2020/0218953 A1 Jul. 9, 2020

(30) Foreign Application Priority Data
Sep. 18, 2017 (EP) .................................. 17306207

(51) Int. Cl.
*G06K 19/06* (2006.01)
*G06F 21/44* (2013.01)

(52) U.S. Cl.
CPC ....... *G06K 19/06103* (2013.01); *G06F 21/44* (2013.01)

(58) Field of Classification Search
CPC .......................... G06K 19/06103; G06F 21/44
(Continued)

(56) References Cited

U.S. PATENT DOCUMENTS

| 2003/0015866 | A1 | 1/2003 | Cioffe et al. |
| 2004/0181671 | A1* | 9/2004 | Brundage ................. H04L 9/00 713/176 |
| 2006/0290136 | A1* | 12/2006 | Alasia .................... G07D 7/128 283/72 |

FOREIGN PATENT DOCUMENTS

| WO | WO2004035321 A1 | 4/2004 |
| WO | WO2008021825 A2 | 2/2008 |
| WO | WO2008021825 A3 | 2/2008 |

OTHER PUBLICATIONS

PCT/EP2018/075160, International Search Report, dated Dec. 6, 2018, European Patent Office, P.B. 5818 Patentlaan 2 NL—2280 HV Rijswijk.

(Continued)

*Primary Examiner* — Daniel A Hess
(74) *Attorney, Agent, or Firm* — The Jansson Firm; Pehr B. Jansson

(57) ABSTRACT

The present invention relates generally a method to authenticate a data carrier, such as passports, licenses, identification card . . . by hiding at least two optically encoded image within a data carrier so that the data carrier is authenticated through at least two factor authentication process. In the methods of the present invention, at least two reliable, readable optically encoded image are hidden within the data carrier wherein each of the encoded image is visible through a same decoder device but under different specific lighting conditions without the former having influence on the quality of the latter. The authentication methodology of the present invention provides an improved security, being even more difficult to reproduce by infringers, even more difficult to remove, replace or exchange and easy to check.

21 Claims, 6 Drawing Sheets

(58) Field of Classification Search
USPC .......................................................... 235/494
See application file for complete search history.

(56) References Cited

OTHER PUBLICATIONS

PCT/EP2018/075160, Written Opinion of the International Searching Authority, dated Dec. 6, 2018, European Patent Office, P.B. 5818 Patentlaan 2 NL—2280 HV Rijswijk.

* cited by examiner

DATA CARRIER AND A METHOD FOR PRODUCING SUCH DATA CARRIER

TECHNICAL FIELD

This invention relates generally to a data carrier and a method for making the data carrier. More particularly, this invention relates to an authentication of the data carrier using at least two different optically encoded security images stored on or with the data carrier to be authenticated; said optically encoded security images being revealed by a special decoding device under special lighting conditions, and a method for making such a data carrier.

BACKGROUND ART

Identification documents are associated with secure applications, such as for example driving licenses, identity cards, membership cards, badges or passes, passports, discount cards, banking cards, money cards, multi-application cards, and other papers of value; and security documents such as bank notes. Such documents are widely used, they may comprise an electronic module or not. If they comprise an electronic module, they can function either with contact and/or without contacts depending on the application to which they are intended for. They may take the shape of card or a booklet or something else.

Such identification documents are graphically personalized. Personalized information is personal data of the card's owner, i.e. for example his photo, his name, his birth date, his social security number, his biometric information such as his fingerprint for example, a validity date, an identification number allocated to him etc. This personalized information is printed onto the surface of the document, or into one or more constitution layers of the document. Because of the value and importance associated with each of these data carriers, they are often the subject of unauthorized copying and alterations, and forgeries.

Document falsification and product counterfeiting are significant problems that have been addressed in a variety of ways. Different types of visual and touchable security features have been added to data carriers. One of these security features has been the use of latent or hidden images applied to or printed on objects to be protected. These images are generally not viewable without the assistance of specialized devices that render them visible.

One approach to the formation of a latent image consists in inserting or encoding optically an image into a background of the document or into the owner's photo, which is printed onto the opaque body of the document. The optically encoded image is inserted in such a way that it is not seen with naked eyes.

Optically encoded images typically cannot be discerned or interpreted without a specially tailored optical decoder. They may be used on virtually any form of printed document including legal documents, identification cards and papers, labels, packaging, currency, stamps, etc. The encoded image can be readily viewed through the placement of the specially decoder device over the image. These decoders such as lenticular or microlens arrays that optically decode the encoded images, must have optical characteristics that correspond to the parameters used to encode so that the encoded image may be viewed through the decoder device. The decoded image is then compared to an expected image for authentication.

Such process for inserting an optical encoding image into an image has been described in document EP1048168.

Although advantageous in some respects, most of these hidden images depend upon complexity and resolution to avoid duplication. Indeed, the optical encoded image can be mimicked by a forger by for example extracting some of the security features in an authentic document and using these as part of a counterfeit document.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In view of the shortcomings of the prior art, it is an object of the present invention to increase the security and anti-counterfeiting capabilities of a variety of data carrier, such as passports, licenses, identification card . . . by hiding at least two optically encoded image within the data carrier so that the data carrier is authenticated through at least two factor authentication process.

In the methods of the present invention, at least two reliable, readable optically encoded image are hidden within the data carrier wherein each of the encoded image is visible through a same decoder device but under a specific lighting conditions without the former having influence on the quality of the latter.

The authentication methodology of the present invention provides an improved security, being even more difficult to reproduce by infringers, even more difficult to remove, replace or exchange and easy to check.

With at least two factor authentication methods readable through a same decoder device under different specific lighting, the present invention provides a data carrier, especially a passport, which meets stringent requirements on security.

The data carrier of the present invention comprises a first optical authentication data and a second optical authentication data. Said first optical authentication data and second optical authentication data can be incorporated into a background pattern of the data carrier and/or a personalized data of the data carrier. The first optical authentication data and the second optical authentication data can be readily viewed through the placement of a specially configured decoder device over the authentication data through the use of specific lighting conditions.

According to the present invention, each authentication data is decoded through the decoder device under a specific lighting conditions depending on the printing composition material of said authentication data.

In an embodiment, the first optical authentication data and the second optical authentication data can be incorporated into a predefined printed area in a same sheet of the data carrier.

In another embodiment, the first optical authentication data and the second optical authentication data are respectively printed into a predefined printed area. Each predefined printed area is positioned into a separate and an opposite data sheet of the data carrier. They are positioned into their respective separate sheet so that when one sheet is turned to the other sheet, the two predefined printed area are aligned and overlapped to each other. To identify the first or the second optical authentication data, the decoder device is placed over the overlapped area enabling looking the first or the second hidden data through the decoder and under respectively different specific lighting conditions.

In another embodiment, the first optical authentication data and the second optical authentication data are respectively printed into a predefined printed area into the same sheet. Each predefined printed area is positioned into a separate layer of the sheet. These two predefined printed area are aligned to each other so that to overlap. To identify the first or the second optical authentication data, the decoder device is placed over the overlap area enabling looking the first or the second hidden data through the window frame and under respectively different specific lighting conditions. In an embodiment, the decoder device is incorporated in a layer of the sheet and positioned so that to overlap with the predefined printed areas in other layers.

In an embodiment, the data carrier comprises a sheet comprising a window wherein the decoder is incorporated. In an embodiment, the structure of the material of the sheet can be modified at least partly to integrate the decoder device.

The first predefined printed area on which the first optical authentication data is printed and the second predefined printed area on which the second optical authentication data are positioned into another sheet of the data carrier so that to be aligned with the decoder device enabling looking from the predefined printed areas of the data carrier through the decoder device to identify the first or the second optical authentication data under respectively different specific lighting conditions.

In an embodiment, the data carrier comprises the decoder device arranged at a side of the data carrier and opposite respectively to the first optical authentication data and the second optical authentication data. When placed above the first optical authentication data or the second optical authentication data, the decoder device reveals with a specific lighting conditions respectively the first optical authentication data or the second optical authentication data.

The decoder device used to decode the optical authentication data can have lenticules or microlens elements regularly or irregularly spaced at a frequency (or frequencies) corresponding to the encoding frequency (or frequencies) of the authentication data allowing the distortions to be assembled to form the original authentication data.

In an embodiment, the decoding can be performed without the use of, for example, physical optical decoding devices. In this case, the first and the second optical authentication data can be decoded through a computer-implemented method by:

capturing images of the first or the second optical authentication data under the respective specific lighting conditions by using one or more digital cameras of a computing device, applying filters to the captured images, and displaying hidden elements in the captured images on the display of the computing device. The specific lighting conditions depend mainly on the nature of the composition material used for printing the authentication data. It can be Ultra-Violet radiations for example, when the composition material is luminescent ink, such as for example either fluorescent ink or bi-fluorescent ink.

The specific lighting wavelengths can also be Infrared radiations. Then, the composition material of the authentication data can be in some way infrared active: IR transparent, IR absorbent, up-converting or specific IR reflection properties. Up-converting ink is fluorescent ink, which emits light of a shorter wavelength (higher in energy) than the light with which the ink is illuminated. Usually, this term is used for an IR fluorescent ink that emits visible light.

The specific lighting wavelengths can also be visible ambient radiations.

In the present invention, the first optical authentication data and the second optical authentication data are respectively revealed when enlightened under a first lighting radiation and a different second lighting radiation. The first optical authentication data is revealed from said enlightened first lighting radiation while the second optical authentication data appears opaque and vice versa.

One major advantage of the data carrier according to the invention is that it is very difficult to forge. Two optical factor authentication enlightened under respectively different lighting radiations are very difficult to tamper without leaving a mark. The data carrier can be manufactured with ordinary machines and without need of expensive materials.

In a various method of the present invention, the invention proposes a method to authenticate a data carrier wherein said data carrier comprising a first side provided with an authentication data, said authentication data comprising at least two optically encoded data wherein each encoded data comprising a latent image invisible or illegible to a naked eye and viewable through a decoder device wherein, the encoded data being generated according to an encoding parameters in accordance with particular parameters of the decoder device each encoded device being printed within a data carrier of the first side with a specific composition material, the latent image of each encoded data is readily viewed through the placement of the decoder device over the authentication data through the use of a specific lighting conditions, said specific lighting conditions depending on the nature of the composition material of said encoded data, wherein, when an encoded data of the authentication data is readable through the decoder device under the associated specific conditions lighting, the other encoded data are invisible or illegible to a naked eye.

To achieve those and other advantages, and in accordance with the purpose of the invention as embodied and broadly described, the invention proposes a method to authenticate a data carrier wherein said data carrier is provided with an authentication data, said authentication data comprising at least two optically encoded data wherein each encoded data comprising a latent image invisible or illegible to a naked eye and viewable through a decoder device wherein when an encoded data of the authentication data is revealed through the decoder device under a specific lighting conditions, the other encoded data remains invisible or illegible to a naked eye.

The present invention relates to a method to authenticate a data carrier wherein said data carrier is provided with an authentication data, said authentication data comprising at least two optically encoded data, a first and a second optically encoded data, wherein each optically encoded data comprising a latent image invisible or illegible to a naked eye and viewable through a decoder device wherein each optically encoded data being generated according to an encoding parameters in accordance with particular parameters of the decoder device, wherein the first optically encoded data and the second optically encoded data of the authentication data are respectively revealed when the decoder device is enlightened under a first specific lighting conditions and a different second specific lighting conditions and wherein when the first optically encoded data is revealed through the decoder device under the first specific lighting conditions, the second optically encoded data appears opaque and remains invisible or illegible to a naked eye and vice versa.

In other various methods, the encoded data of the authentication data are printed into one predefined printed area of the data carrier.

In other various methods, each encoded data of the authentication data are printed into one predefined printed area.

In an embodiment, each printed area is opposite to the other printed so that when one of the printed area is turned to the other the encoded data overlapped.

In another embodiment, the data sheet comprises layers wherein each printed area is positioned in a separate layer of the data sheet in accurate register relationship so that to be overlapped.

In other various methods, at least one of the printed area is a see through window.

In other various methods, the decoder is positioned in a layer of the data sheet so that to overlap with the printed areas.

In other various methods, the invention relates also that:

the encoded data is printed into the printed area of the data carrier with a specific composition material, the latent image of the encoded data is readily viewed through the decoder device under said specific lighting conditions, said specific lighting conditions depending on the nature of the composition material of said encoded data.

The encoded data is generated according to an encoding parameters in accordance with particular parameters of the decoder device In other various methods, the data carrier comprises a window wherein the decoder device is incorporated or the decoder device is formed of a sheet like material and is attached to the data carrier and wherein said decoder device is opposite to the printed area.

In other various methods, the data to be encoded is an image, indicia, indicia related to the background image of the data carrier or any personalized data of the data carrier holder.

In other various methods, the printed area comprises a blank gray, colored background image or visible image content such as a design or photograph or any personalized data of the data carrier holder.

In other various methods, the decoder device is simulated through a computer-implemented method.

In other various methods, the specific lighting condition is:

Ultra-Violet radiations when the composition material is luminescent ink, such as fluorescent ink or bi-fluorescent ink, Infrared radiations when the composition material is infrared active such as IR transparent, IR absorbent, up-converting or specific IR reflection properties, visible ambient radiations when the composition material is visible radiations, a mix of IR or UV sensitive ink with visible inks for combinations of effects wherein each encoded data is printed with partially or completely said composition material.

In other various methods, the encoded data is printed into the data carrier such as offset printing or with a personalization technique such as inkjet printing, laser engraving, retransfer, Dye Diffusion Thermal Transfer (D2T2).

The present invention relates also to a data carrier comprising an authentication data, said authentication data comprising at least two optically encoded data wherein each encoded data comprising a latent image invisible or illegible to a naked eye and viewable through a decoder device wherein when an encoded data of the authentication data is revealed through the decoder device under a specific lighting conditions, the other encoded data remains invisible according to the present invention.

In other various methods, the data carrier is an identification card, credit card, passport, or a name badge.

Other aspects and advantages of the invention will become apparent from the following detailed description, taken in conjunction with the accompanying drawings, illustrating by way of examples the principles of the invention.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
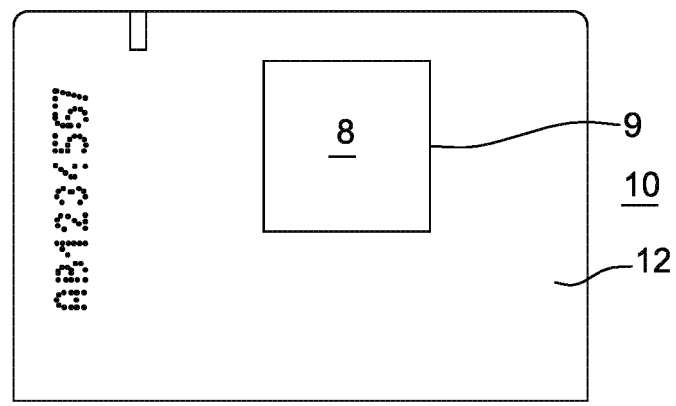
FIG. 1 schematically illustrates a data carrier wherein is hidden a first and second optical authentication data.

It is to be understood that various other embodiments and variations of the invention may be produced without departing from the spirit or scope of the invention. The following is provided to assist in understanding the practical implementation of particular embodiments of the invention.

The same elements have been designated with the same referenced numerals in the different drawings. For clarity, only those elements which are useful to the understanding of the present invention have been shown in the drawings and will be described.

Reference throughout the specification to "an embodiment" or "another embodiment" means that a particular feature, structure, or characteristic described in connection with an embodiment is included in at least one embodiment of the subject matter disclosed. Thus, the appearance of the phrases "in an embodiment" or "in another embodiment" in various places throughout the specification is not necessarily referring to the same embodiment. Further, the particular features, structures or characteristics may be combined in any suitable manner in one or more embodiments.

Hereafter, an embodiment of the present invention will be described in the context of data carrier which can be authenticated through a two factor authentication methodology.

Throughout this disclosure, the term "substrate" includes a paper substrate, a polymer substrate, a polycarbonate substrate, a plastic substrate, a foil substrate, a film substrate, or the like. The substrate may have personalized data placed thereon to render data carriers, such as banknotes, passports, identification card, or the like. This disclosure can be applied to documents used in security, marketing, packaging appeal, consumer interaction products, identification or the like.

The personalized information and data may include, but are not limited to, text, graphics, photographs, multimedia images, name, date of birth, address, personnel number, signature, portrait, company logos, a serial number, a national or department emblem or initials etc.

In an embodiment, the personalized data may be physically rendered on the substrate using an imaging device, such as a printer, laser or the like.

FIG. 1 illustrates a data carrier in the form of an identification card 10, e.g. a passport or a driving license. The identification card 10 of the present invention can be manufactured according to any type of known manufacturing process.

The identification card 10 illustrated in FIG. 1 comprises a data sheet 12. In the example herein described, a data sheet is a page of the passport.

The data sheet 12 comprises a printed area 9 wherein an authentication data 8 is printed on its substrates to enable visual authentication of the data carrier. In an embodiment, the authentication data 8 comprises at least two optically encoded images which can be a background of the identification card 10 or a source image.

Figure 2:
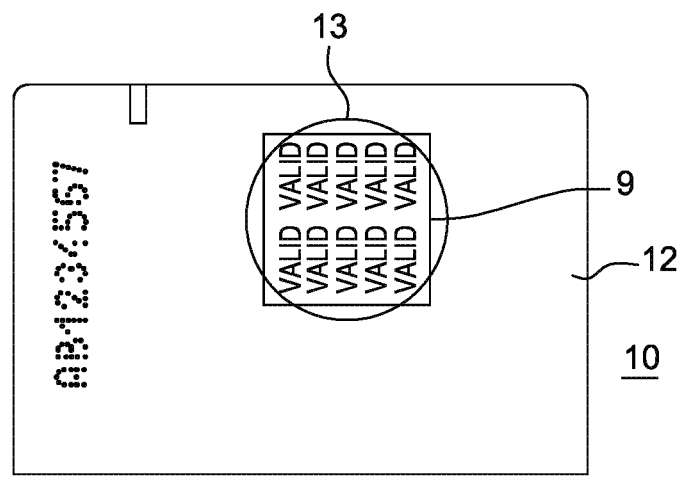
FIG. 2 schematically illustrates the result of a decoded authentication data under a specific lighting conditions through a decoder.

Herein, the term "encoded image" refers to an image that is manipulated and/or hidden within a background field or within another image of the identification card 10 in such a way that when applied or printed, the encoded image cannot be discerned by the human eye without the use of a decoding device 13, as illustrated in FIG. 2, and under a specific lighting conditions.

Some encoded images are hidden so that their presence is difficult to discern from the printed area 9. Other encoded images can be easily visible but not readable because the image content has been systematically scrambled or otherwise manipulated.

Encoded images techniques are well known to the persons skilled in the art. The particular suitability of such techniques will vary depending on what effects are desired to be achieved and there compatibility with the hidden image techniques described below. Persons skilled in the art can readily ascertain their suitability.

With reference to the present invention, the first encoded data and the second encoded data are respectively established using a first image and a second image. The first encoded data and the second encoded data are embedded into the printed area 9 in such a way that the first encoded data and the second encoded data can only be viewed through the decoding device 13 of a predetermined frequency under respectively different specific lighting conditions.

The printed area 9 may comprise a blank gray, colored background image or may comprise visible image content such as a design or photograph or any personalized data.

The encoded data of the authentication data 8 may be any form of image or indicia, may include indicia related in some way to the background image or may be any personalized data.

Figure 3:
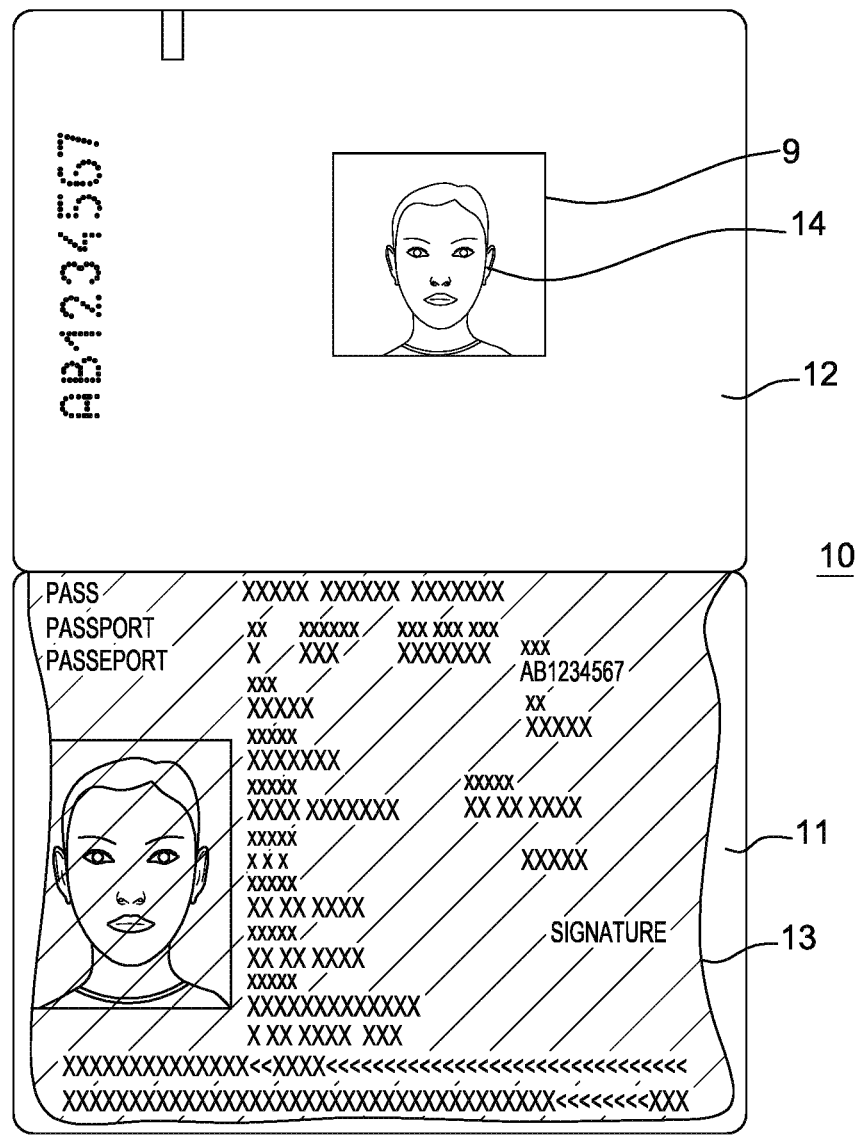
FIG. 3 and FIG. 5 schematically illustrate embodiments of a data carrier wherein a decoder device is incorporated thereof.

The identification card 10, illustrated in FIG. 3, comprises a second data sheet 11 opposite to the data sheet 12.

In the example herein described, the second data sheet 11 is a datapage which may bear a name, date of birth, place of birth of the data carrier holder and other biographic information.

In an embodiment, the decoder device 13 can be a standalone device or if the identification card 10 is a self-authenticating datapage, the decoding device 13 is incorporated therein the data carrier.

In the example illustrated in FIG. 3, the printed area 9 comprises a primary image 14. The primary image 14 is a picture of the bearer of the identification card 10. In this illustrated embodiment, the first encoded data and the second encoded of the authentication data 8 are a repeating pattern based on the words "VALID."

Each encoded data can be separately encoded then printed into the primary image 14 or the process of printing may be accomplished in such a way that each encoded data is encoded as it is printed.

The two encoded data of the authentication data 8 are typically encoded by one of several methods that may involve establishing a regularized periodic pattern having a frequency corresponding to that of the decoder device 13, then introducing distortions of the pattern that render the image difficult to discern with the naked eye. The authentication data 8 are configured to be optically decoded using the decoder device 13 based on the lenticule frequency of the decoder device lens.

The produced first encoded data and second encoded data are encoded in accordance with particular parameters of the decoder device 13, whereby revelation of the hidden authentication data 8 is only achievable by a decoder of a particularly frequency.

The encoded data process can involves rasterizing, or dividing up into elements, such as dots, lines or pixels, the primary image 14. With known digital compensating procedure, these elements of the primary image 14 can be reformed, distorted or modified in order to implement the encoded data, making the encoded data invisible to the un-aided eye with respect to the primary image 14.

In an embodiment, the encoded data of the authentication data 8 can be generated with a modulation process of the data to be encoded. The data to be encoded can be text, picture, pattern, alphanumeric, or other optically recognizable image or any personalized data.

The data to be encoded is modulated in a frequency sufficiently high that a uniform field is observed by the naked eye. The frequency of the modulation depends on the decoder device 13 frequency. The modulation of the data to be encoded, corresponding to a function of an original image, provides lines and dots that may take arbitrary shapes. The encoded data can be provided by a modulation by phase, frequency, angle, size/width, shape and/or colour. In an embodiment, the modulation process can also be carried out by digital image processing.

The embodiments provided here to generate the encoded data are well known. Several known technologies for generating hidden data, invisible or illegible to the naked eye can also be used.

After the generation of the encoded data, the encoded data can be printed to the printed area 9 according to a predefined authentication method. The authentication method is defined according to at least the followings characteristics:
  the type of the composition material,
  the type of printing such as traditional (offset, intaglio etc. . . . ) or digital printing (laser printers, inkjet printers, dye sublimation printers . . . ), and
  the specific lighting conditions associated to the composition material.

During the printing phase, in an embodiment, at least one of the encoded data is included into the primary image 14 such as offset printing on the substrate of the printed area 9 of the data sheet 12.

During the printing phase, in an embodiment, at least one of the encoded data, comprising personalized data such as a birth date, picture or name, is printed into the primary image 14 with any existing personalization technique such as inkjet printing, laser engraving, retransfer, Dye Diffusion Thermal Transfer (D2T2), . . . .

During the printing phase, in an embodiment, at least one of the encoded data is included into the primary image 14 such as offset printing and at least one of the encoded data comprise personalized data printed into the primary image 14 with any existing personalization technique.

The encoded data of the authentication data 8 are printed into the substrate of the data sheet 12 with a predefined composition material. According to an embodiment of the present invention, the composition material of one encoded data of the authentication is different of the composition material of the others encoded data of the authentication data 8.

In an embodiment, the composition material may be for example printable luminescent ink, which is colorless under visible lighting, but which reacts to invisible wavelengths radiations with a visible emission color. It can be for example fluorescing ink or bi-fluorescing ink; which has no body color, but which reacts to Ultra-Violet wavelengths. It can also be colorless printable up-converting ink that reacts to IR wavelengths with a visible emission color.

In another embodiment, the composition material can also be an applied film, which consists of a polarizing filter for example. In this case, the specific lighting conditions are of specific polarization such as circular or linear polarization. The composition material can react to specific lighting wavelengths such as either visible radiations or UV radiations or IR radiations, with a specific polarization.

In another embodiment, the composition material can also be printable ink, which is visible under ambient lighting.

With the present invention, when the decoder device 13 is enlightened under the corresponding wavelength radiations that depend on the nature of the composition material of the encoded data, said encoded data is decoded and appear to a viewer while the other encoded data of the authentication data remain hidden from the viewer.

According to an embodiment, under visible ambient lighting, the see-through portion of the subarea 15 comprising the decoder 13 appears transparent and the primary image 14 of the printed area 9 is visible with the same appearance and original color. Then, when the see-through portion is enlightened under for example a predetermined UV wavelengths, the corresponding encoded data of the authentication data is revealed.

In an embodiment, the composition material of the first encoded data is a luminescent ink visible at a wavelength $\lambda 1$, of 365 nm for example, while the composition material of the second encoded data is a luminescent ink visible at a wavelength $\lambda 2$, of 254 nm for example. During authentication phase of the first encoded data, the decoder device 13 placed above the primary image 14 has to be enlightened with a UV wavelength $\lambda 1$ of 365 nm in order that the fluorescing ink reacts to this wavelength to make appear the decoded first encoded data while the second encoded data does not react with this wavelength and prevent any emission, or transmission through the decoder device 13 and remains hidden.

A further variant may consist in mixing the IR or UV sensitive ink, which is used as composition material, with visible inks to give combinations of effects. Each encoded data of the authentication data can be printed with partially or completely by such mixtures, such that when illuminated with IR light for example, one of the mixtures lets the light pass through acting as composition, while the other blocks the light acting as filter, and reciprocally. The mixtures may have the same color, such that they cannot be distinguished under normal light source. In the case where a polarizing ink is used as composition material, it can also be colored with visible ink in order to give also combinations of effects.

In an embodiment, the composition material of one of the encoded data is an UV fluorescent inks printed into the primary image 14 with a predefined known color separation and half-tone printing process. Under normal daylight and through the decoder 13, the encoded data turn into brilliant true-color images with excellent color reproduction at under 365 nm UV exposure.

The design complexity and color content of each encoded data of the authentication data is virtually limitless, lending this disclosure to new and creative applications. Content may be variable or unique for each authentication data.

A typical decoder device 13 is formed as a transparent or translucent planar element with lens elements (e.g. lenticules or microlenses). The decoder devices must have sufficient thickness to support lens elements with a particular configuration and focal length. Such lenses can be made from clear plastic and can be somewhat rigid in order to maintain the relative spacing of the lens elements.

The decoder device 13 may be a Fresnel lens, which can be inlaid, preformed, or produced by an intaglio engraving process. The decoder device 13 may be an array of lenticular elements (lenticular lenses) commonly known from identification documents. In an embodiment, the decoder device 13 may be a reflective surface. The topography of the reflective surface is constructed so that light reflected from the reflective surface and through the encoded image produces a sampling effect similar to that of the lens. By constructing the reflective surface topography so that one or more of its characteristics correspond to the encoding parameters, the light reflected through the encoded image allows the embedded image to be viewed according to the corresponding specific lighting conditions.

The decoder device 13 may be configured with various filter image designs, including complex patterns, geometric structures, or the like.

Figure 4:
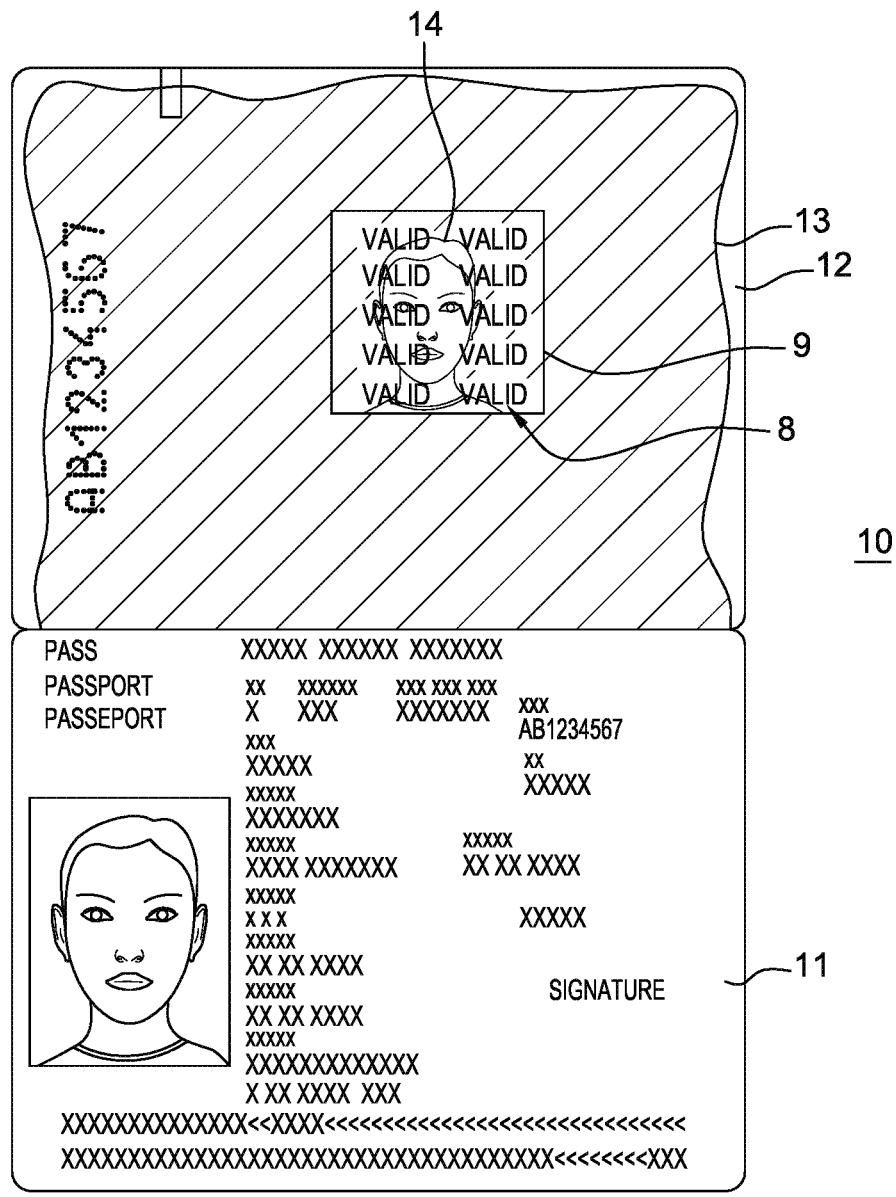
FIG. 4 and FIG. 6 schematically illustrate the result of a decoded encoded data under a specific lighting conditions through the decoder illustrated respectively in FIG. 3 and FIG. 5.

In an embodiment as illustrated in FIG. 3 and FIG. 4, the decoder device 13 is sized to follow the shape of the identification card 10. The decoder device 13 is formed of the sheet like material and is attached to the identification card 10 in a similar manner as the remaining pages. As shown in FIG. 3, the decoder device 13 is placed over the printed area 9 for purposes of revealing the first or the second encoded data through the suitable specific lightings conditions.

Figure 5:
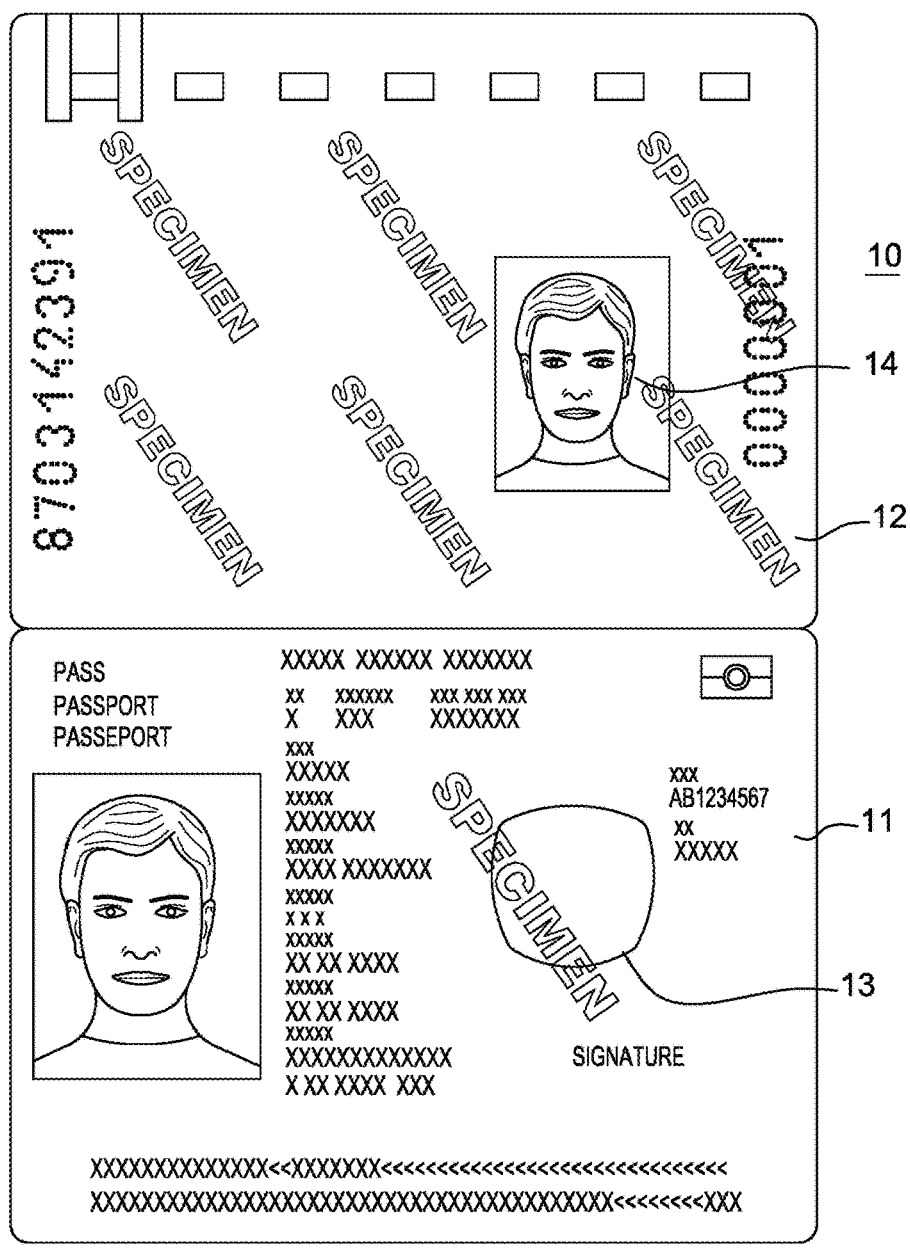

In another example of this use, FIG. 5 depicts a pictorial view of an identification card 10 having a printed area 9 comprising the primary image 14 wherein the authentication data 8 is hidden. The authentication data 8 comprises the first and second encoded data placed therein the primary image 14. In this embodiment, the decoder device 13 is formed integral to an identification card sheet opposite to the printed area 9. In the embodiment illustrated in FIG. 5, the decoder device is formed integral into a window of the second data sheet 11.

Figures 7, 8:
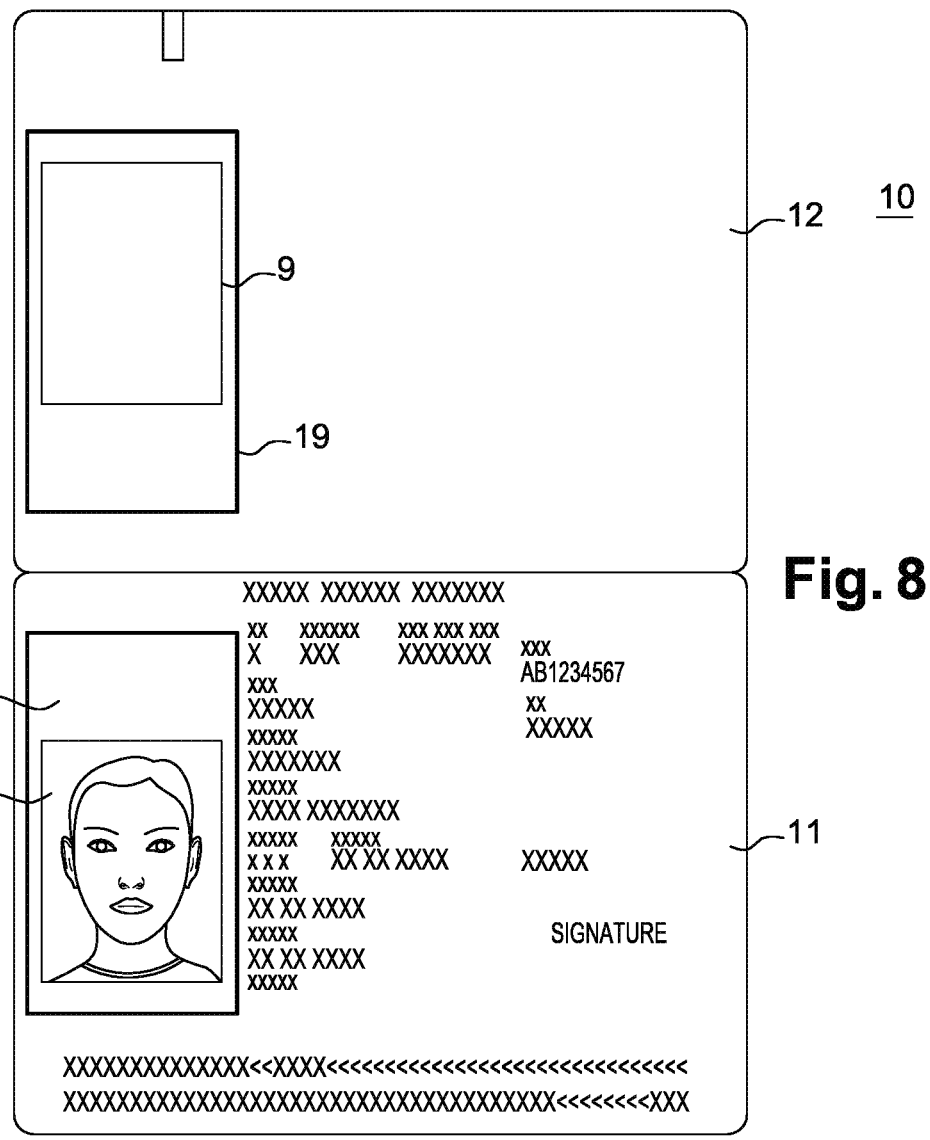
FIG. 7 schematically illustrates an exploded perspective view of two sheet of the data carrier illustrated at FIG. 5.
FIG. 8 and FIG. 9 schematically illustrate embodiment of a data carrier wherein the first and the second authentication data overlap into a see through window.

As illustrated in FIG. 7, the second data sheet 11 comprise in a subarea 15, indicated by broken line, thereof the decoder device 13, as a verification means of the authenticity of the first and second encoded data. The subarea 15 can be transparent or opaque when viewed against the light. The subarea 15 is used as a verification filter or for visualization of the first and second encoded data. The subarea 15, which is a see-through window, can be an opening or a transparent plastic window. Furthermore, the subarea 15 may be either of circular shape, or of any other shapes such as rectangular, oval, diamond, annular etc. . . . .

As shown in FIG. 7, when the second data sheet 11 is placed over the printed area 9, the lens of the decoder device 13 has been placed in an alignment position for purposes of revealing either the hidden first encoded data according to a first specific lighting conditions or the hidden second encoded data according to a second specific lighting conditions.

Figure 6:
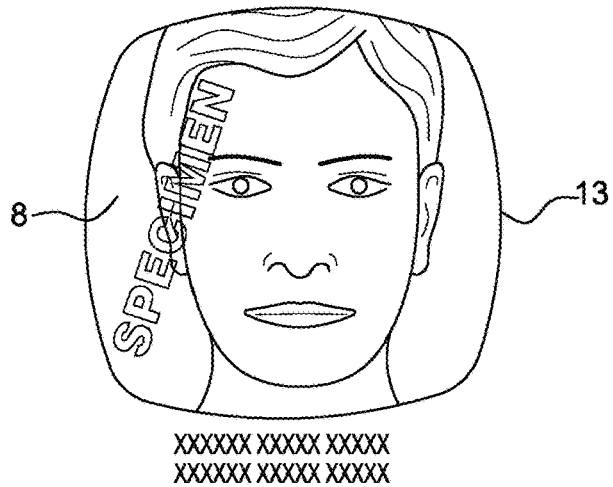

In an embodiment illustrated in FIG. 6, the first encoded data is provided with an UV composition material and the second encoded data is provided with an IR composition material, or reciprocally. In an embodiment, the UV composition material and the IR composition material can be transparent or reflective. In this case, the first encoded data can be read under UV lighting and the second encoded data can be read under IR lighting. When the decoder 13 is applied to the printed area 9, under the UV lighting, the first encoded image is decoded and the decoded data is a repeating pattern based on the words "SPECIMEN".

In an embodiment illustrated in FIG. 8, the first authentication data is printed into the data sheet 11 of the identification card 10 into a first window frame 18. The second authentication data is printed into another data sheet 12 opposite to the data sheet 11 into a second window frame 19. The position of these two window frames are defined into their respective data sheet so that when one of the data sheet is turned to the other the two authentication data overlap. In an embodiment, at least one of the window frame is a see through window.

Figure 9:
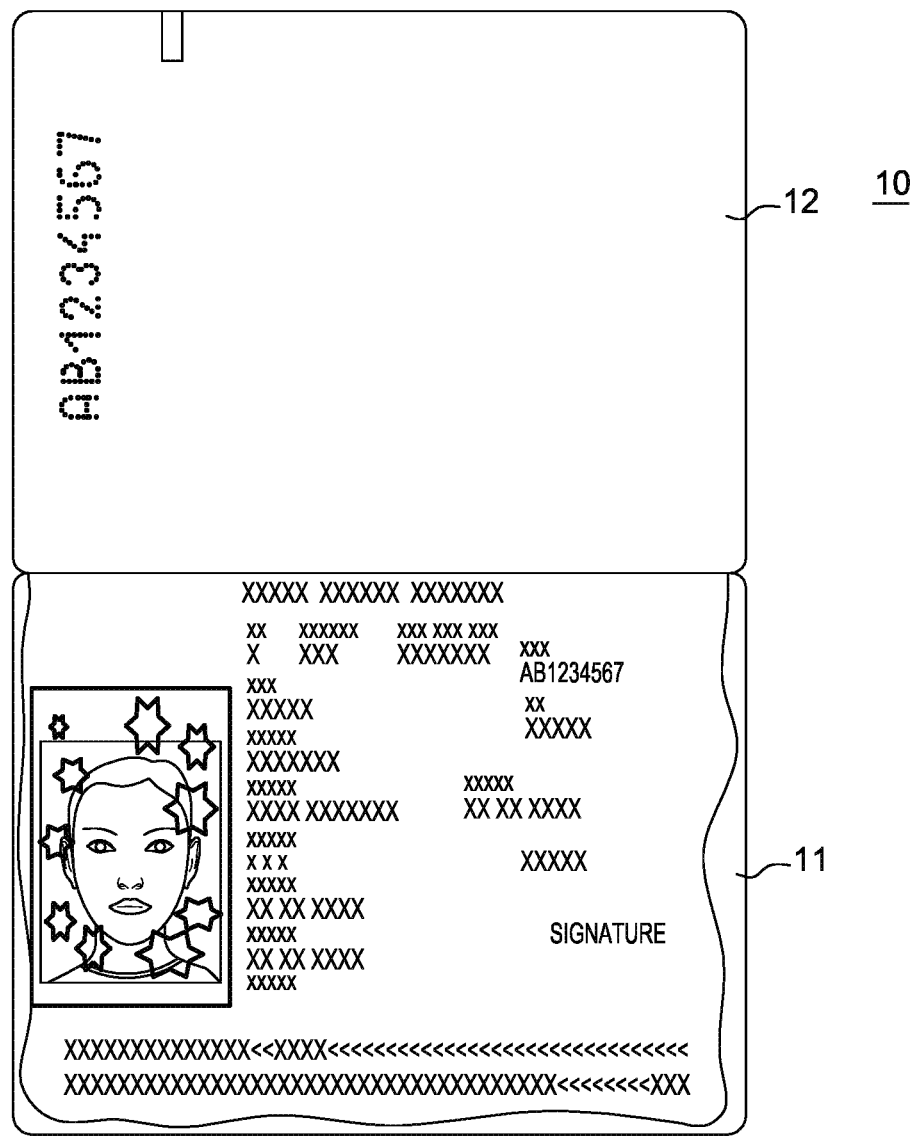

As shown in FIG. 9, the decoder device 13, formed of the sheet like material, is placed over the see through window frame for purposes of revealing the first or the second encoded data through the suitable specific lightings conditions.

In another embodiment, the data sheet can be made with several individual layers coated or not. The data sheet can be made in plastic material, such as polycarbonate, polyvinyl chloride (PVC), polyethylene terephthalate (PET) or acrylonitrile butadiene styrene (ABS). It may also be a combination of these plastic materials. In this embodiment, each authentication data is positioned in its separate layer of the data sheet in accurate register relationship, preferably in aligned mutually superposed relationship, so that to be overlapped in a predefined see through window.

To identify the first or the second optical authentication data, the decoder device can be placed over the see through window enabling looking the first or the second hidden data under respectively different specific lighting conditions.

In an embodiment, the decoder 13 can be positioned in a layer of the data sheet. The decoder 13 may be arranged in a superposed relationship, so that to be overlapped with the see through window of the first authentication data and the second authentication. By turning around the data sheet and looking through the decoder device 13 which is over or in a rear side of the see through window, the first or the second encoded data is revealed with the suitable specific lightings conditions.

With the present invention, the authentication data is authenticated by decoding the encoded data and by comparing the decoded data to an expected data. The encoded data is configured so that tampering with the information on the data carrier is readily apparent.

It will be appreciated by those skilled person that changes could be made to the embodiments described above without departing from the broad inventive concept thereof. It is understood, therefore, that this invention is not limited to the particular embodiments disclosed, but it is intended to cover modifications, variations, combinations and equivalents within the scope of the present invention.

For example, the printed area 9 can be implemented into the second data sheet 11 bearing personalized data of the data carrier holder. In case of a self-authenticating data carrier, the decoded device can be either a sheet like material attached to the identification card 10 or incorporated into a data sheet opposite to the second data sheet and aligned to the printed area 9.

For example, the decoding can be performed without the use of a physical decoder 13 as illustrated. In this case, the first and the second optical authentication data can be decoded through a computer-implemented method.

For example, the authentication can comprises more than two encoded data and wherein each data of the encoded data is:
  encoded according to known encoding techniques and the decoder device parameters,
  printed with composition material different from other encoded data of the authentication data,
  printed with predefined printing techniques as offset printing or personalized printing techniques.

For example, the data carrier comprises several printed area 9 which can be placed in different sheet. At least one encoded data can be printed into one printed area 9. If the data carrier is a self-authenticating datapage, the decoder device and the printed area are placed so that to be opposite to each other.

The invention should not be limited by the above described embodiments, methods and examples. Accordingly, it is intended that the appended claims cover such variations as fall within the scope of the invention.

The invention claimed is:

1. A method to authenticate a data carrier, the method comprising:
   providing said data carrier with a decoder device having a lenticule frequency;
   providing said data carrier with at least one data sheet comprising a first and a second optically encoded data, wherein each optically encoded data comprising a latent image invisible or illegible to a naked eye and viewable through a decoder device wherein each optically encoded data being generated according to an encoding matching the lenticule frequency of the decoder device, wherein:
   the first optically encoded data is revealed when viewed through the decoder device and the decoder device is enlightened under a first specific lighting conditions; and
   the second optically encoded data is revealed when viewed through the decoder device and the decoder device is enlightened with a second specific lighting condition that is different from the first specific lighting condition; and
   wherein the data carrier comprises more than one sheet or more than one layer of the same sheet, and the first optically encoded data and the second optically encoded data are respectively printed into a predefined printed area, each predefined printed area being positioned into a separate sheet of the data carrier or in different layers of the same sheet, in such a way that the two predefined printed areas are aligned and overlapped to each other, for example when one sheet is turned to the other sheet or by stacking layers of the same sheet, and at least one of the printed areas is a see-through window through which the other printed area may be revealed;

wherein when the first optically encoded data is revealed through the decoder device under the first specific lighting conditions, the second optically encoded data appears opaque and remains invisible or illegible to a naked eye; and wherein when the second optically encoded data is revealed through the decoder device under the second specific lighting conditions, the first optically encoded data appears opaque and remains invisible or illegible to a naked eye.

2. The method according to claim 1 comprising printing each printed area opposite to the other printed area on separate sheets so that when one of the printed area is turned to the other printed area the encoded data is overlapped.

3. The method according to the claim 1, comprising positioning at least two layers of the same sheet each having a printed area in accurate register relationship with printed area of an at least one other printed area so as to be overlapped.

4. The method according to claim 3, comprising positioning the decoder in a layer of the data sheet so as to overlap with the printed areas in the other layers.

5. The method according to claim 1, wherein the data carrier comprises a window wherein the decoder device is incorporated or the decoder device is formed of a sheet like material and is attached to the data carrier and wherein said decoder device is opposite to the printed area or the decoder device is simulated through a computer-implemented method.

6. The method according to claim 1, wherein
the encoded data is printed into the printed area of the data carrier with a specific composition material,
the latent image of the encoded data is readily viewed through the decoder device under said specific lighting conditions, said specific lighting conditions depending on the nature of the composition material of said optically encoded data.

7. The method according to claim 1, wherein the data to be encoded is an image, indicia, indicia related to the background image of the data carrier or any personalized data of the data carrier holder.

8. The method according to claim 1, wherein the printed area comprises a blank gray, colored background image or visible image content such as a design or photograph or any personalized data of the data carrier holder.

9. The method according to claim 1, wherein the specific lighting condition is:
Ultra-Violet radiations when the composition material is luminescent ink, such as fluorescent ink or bi-fluorescent ink,
Infrared radiations when the composition material is infrared active such as IR transparent, IR absorbent, up-converting or specific IR reflection properties,
visible ambient radiations when the composition material is visible radiations, or
a mix of IR or UV sensitive ink with visible inks for combinations of effects wherein each encoded data is printed with partially or completely said composition material.

10. The method according to claim 1, wherein the encoded data is printed into the data carrier such as offset printing or with a personalization technique such as inkjet printing, laser engraving, retransfer, Dye Diffusion Thermal Transfer (D2T2).

11. A data carrier comprising:
a decoder device having a lenticule frequency; and
at least one data sheet, the at least one data sheet having a first and a second optically encoded data, wherein each encoded data includes a latent image invisible or illegible to a naked eye and viewable through the decoder device, wherein each optically encoded data being generated according to an encoding matching the lenticule frequency of the decoder device, wherein:
the first optically encoded data is revealed when viewed through the decoder device and the decoder device is enlightened under a first specific lighting conditions; and
the second optically encoded data is revealed when viewed through the decoder device and the decoder device is enlightened with a second specific lighting condition that is different from the first specific lighting condition; and
wherein the data carrier comprises more than one sheet or more than one layer of the same sheet, and the first optically encoded data and the second optically encoded data are respectively printed into a predefined printed area, each predefined printed area being positioned into a separate sheet of the data carrier or in different layers of the same sheet, in such a way that the two predefined printed areas are aligned and overlapped to each other, for example when one sheet is turned to the other sheet or by stacking layers of the same sheet, and at least one of the printed areas is a see-through window through which the other printed area may be revealed;
wherein when the first optically encoded data is revealed through the decoder device under the first specific lighting conditions, the second optically encoded data appears opaque and remains invisible or illegible to a naked eye; and
wherein when the second optically encoded data is revealed through the decoder device under the second specific lighting conditions, the first optically encoded data appears opaque and remains invisible or illegible to a naked eye.

12. The data carrier according to claim 11, wherein the carrier is an identification card, credit card, passport, or a name badge.

13. The data carrier according to claim 11 wherein each printed area is printed opposite to the other and printed on separate sheets so that when one of the printed area is turned to the other printed area the encoded data is overlapped.

14. The data carrier according to claim 11 wherein the data sheet comprises layers wherein each printed area is positioned in a separate layer of the same data sheet in accurate register relationship with printed area of an at least one other printed area so as to be overlapped.

15. The data carrier according to claim 11 wherein the decoder is positioned in a layer of the data sheet so that to overlap with the printed areas in the other layers.

16. The data carrier according to claim 11, wherein the decoder device is incorporated or the decoder device is formed of a sheet like material and is attached to the data carrier and wherein said decoder device is opposite to the printed area or the decoder device is simulated through a computer-implemented method.

17. The data carrier according to claim 11, wherein
the encoded data is printed into the printed area of the data carrier with a specific composition material,
the latent image of the encoded data is readily viewed through the decoder device under said specific lighting conditions, said specific lighting conditions depending on the nature of the composition material of said optically encoded data.

18. The data carrier according to claim 11, wherein the data to be encoded is an image, indicia, indicia related to the background image of the data carrier or any personalized data of the data carrier holder.

19. The data carrier according to claim 11, wherein the printed area comprises a blank gray, colored background image or visible image content such as a design or photograph or any personalized data of the data carrier holder.

20. The data carrier according to claim 11, wherein the specific lighting condition is:

Ultra-Violet radiations when the composition material is luminescent ink, such as fluorescent ink or bi-fluorescent ink, Infrared radiations when the composition material is infrared active such as IR transparent, IR absorbent, up-converting or specific IR reflection properties, visible ambient radiations when the composition material is visible radiations, a mix of IR or UV sensitive ink with visible inks for combinations of effects wherein each encoded data is printed with partially or completely said composition material.

21. The data carrier according to claim 11, wherein the encoded data is printed into the data carrier such as offset printing or with a personalization technique such as inkjet printing, laser engraving, retransfer, Dye Diffusion Thermal Transfer (D2T2).

* * * * *